Patented Aug. 3, 1926.

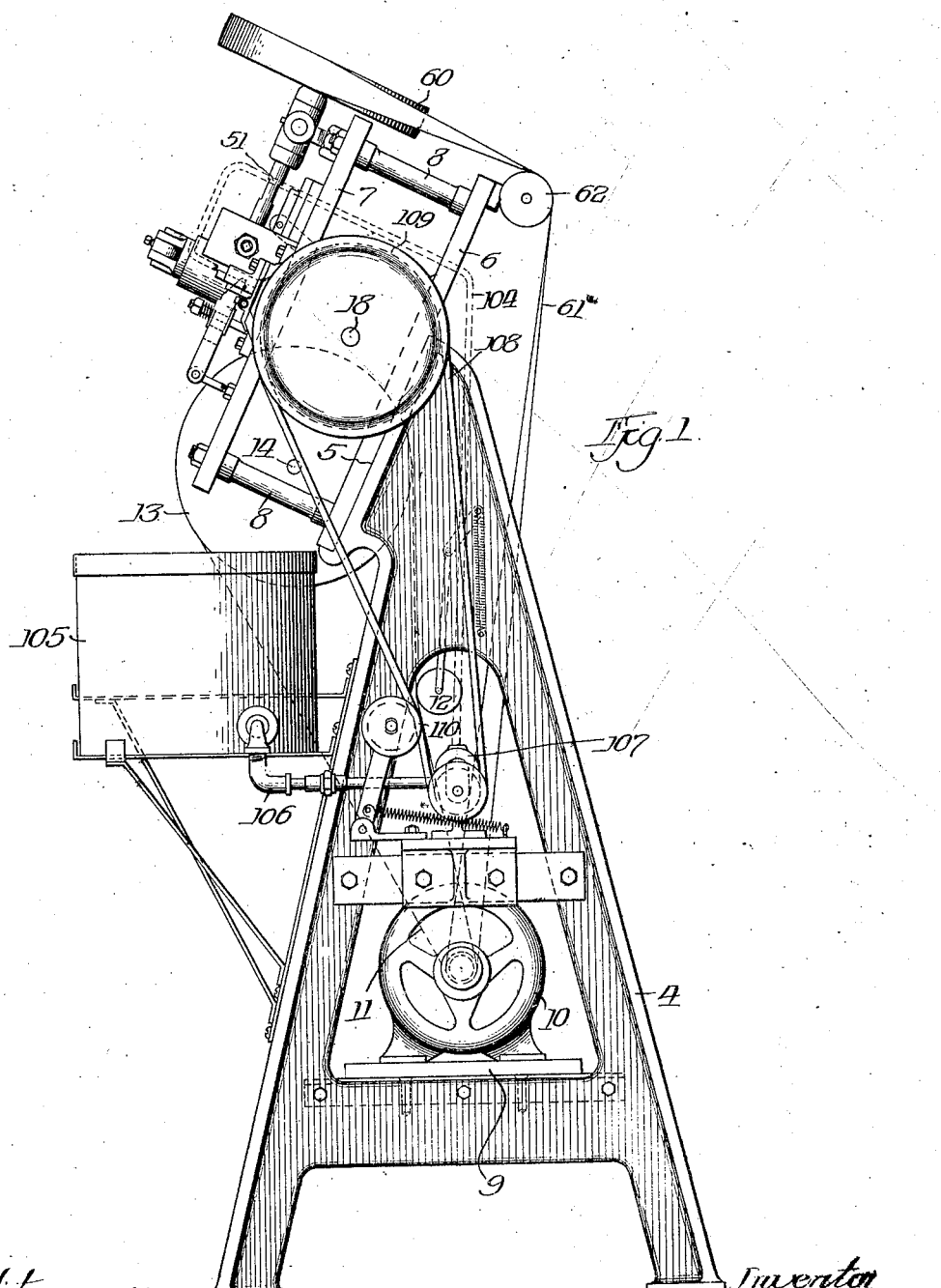

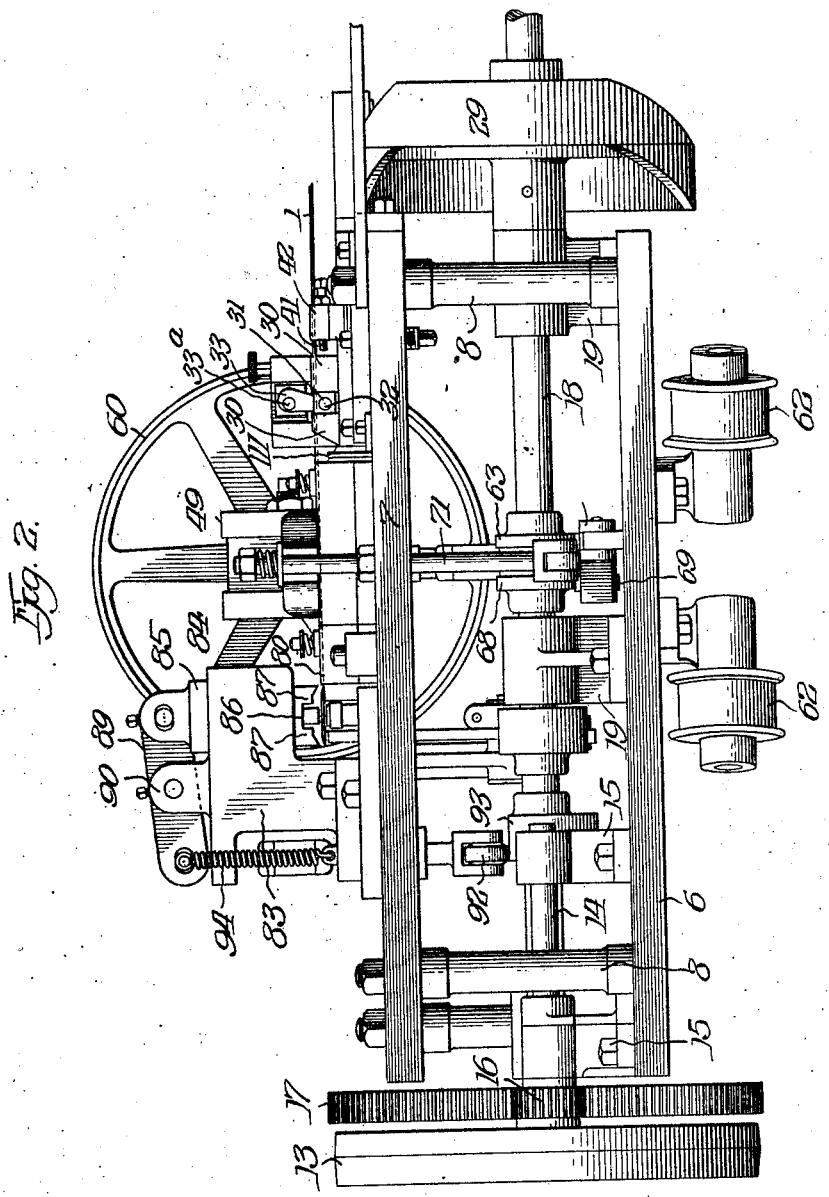

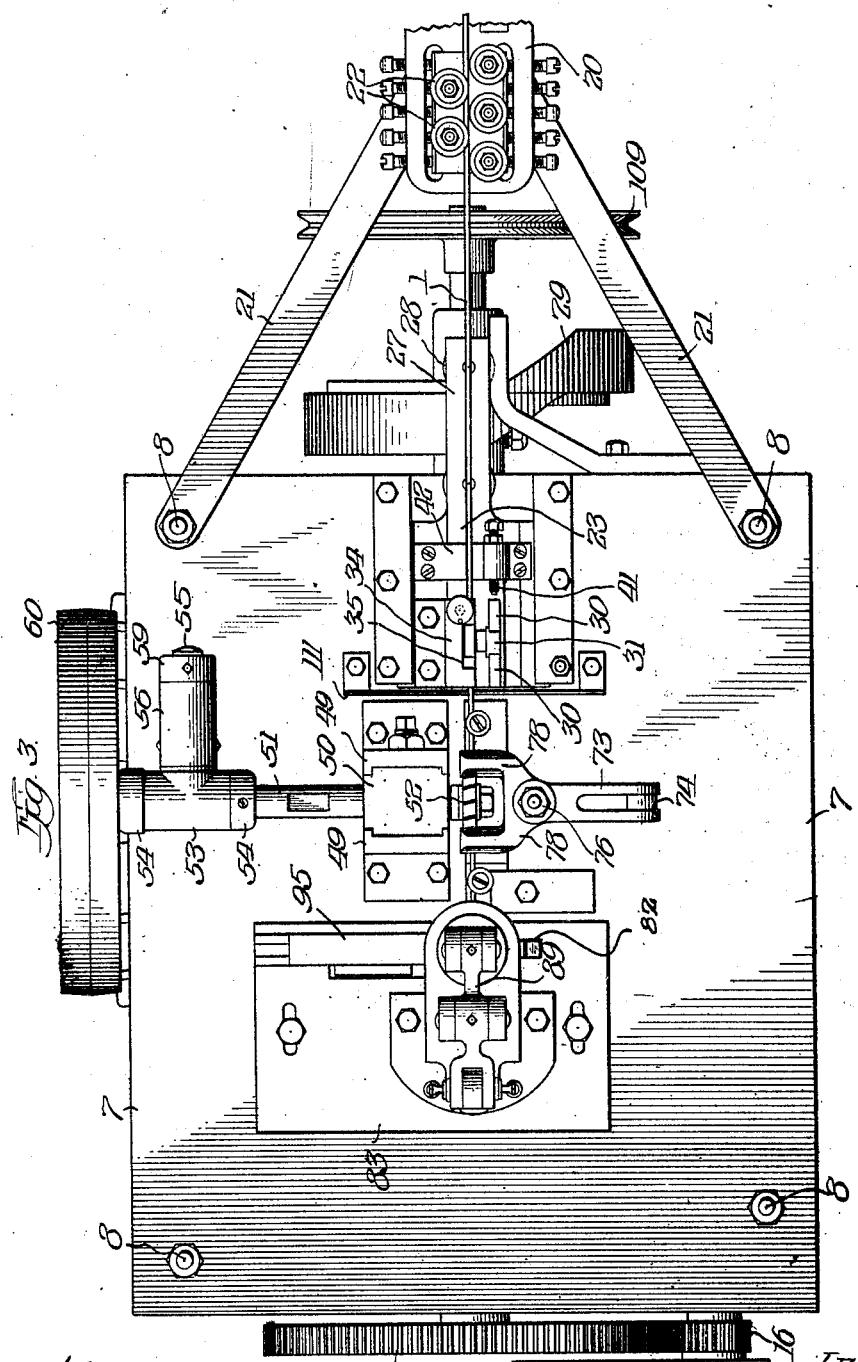

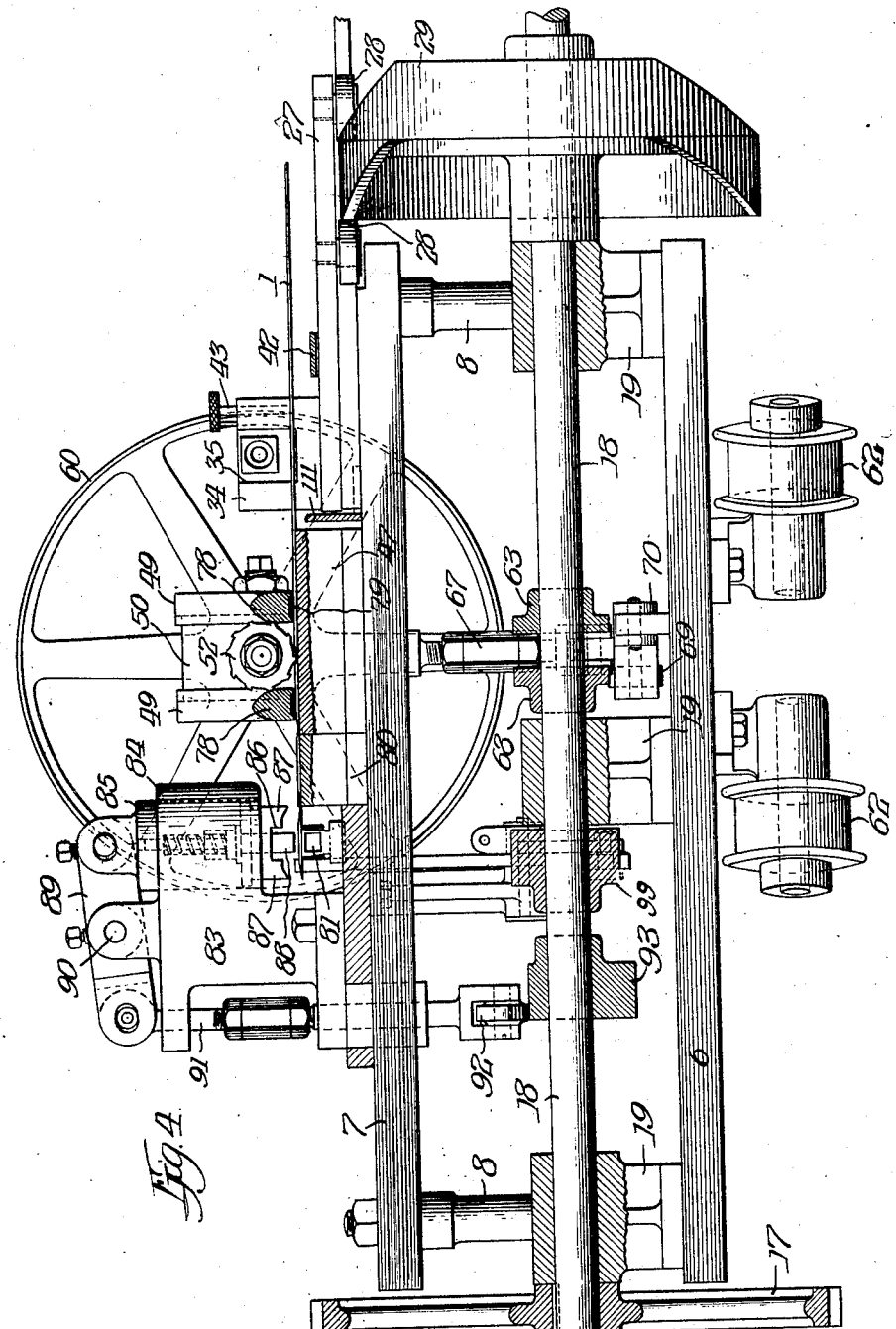

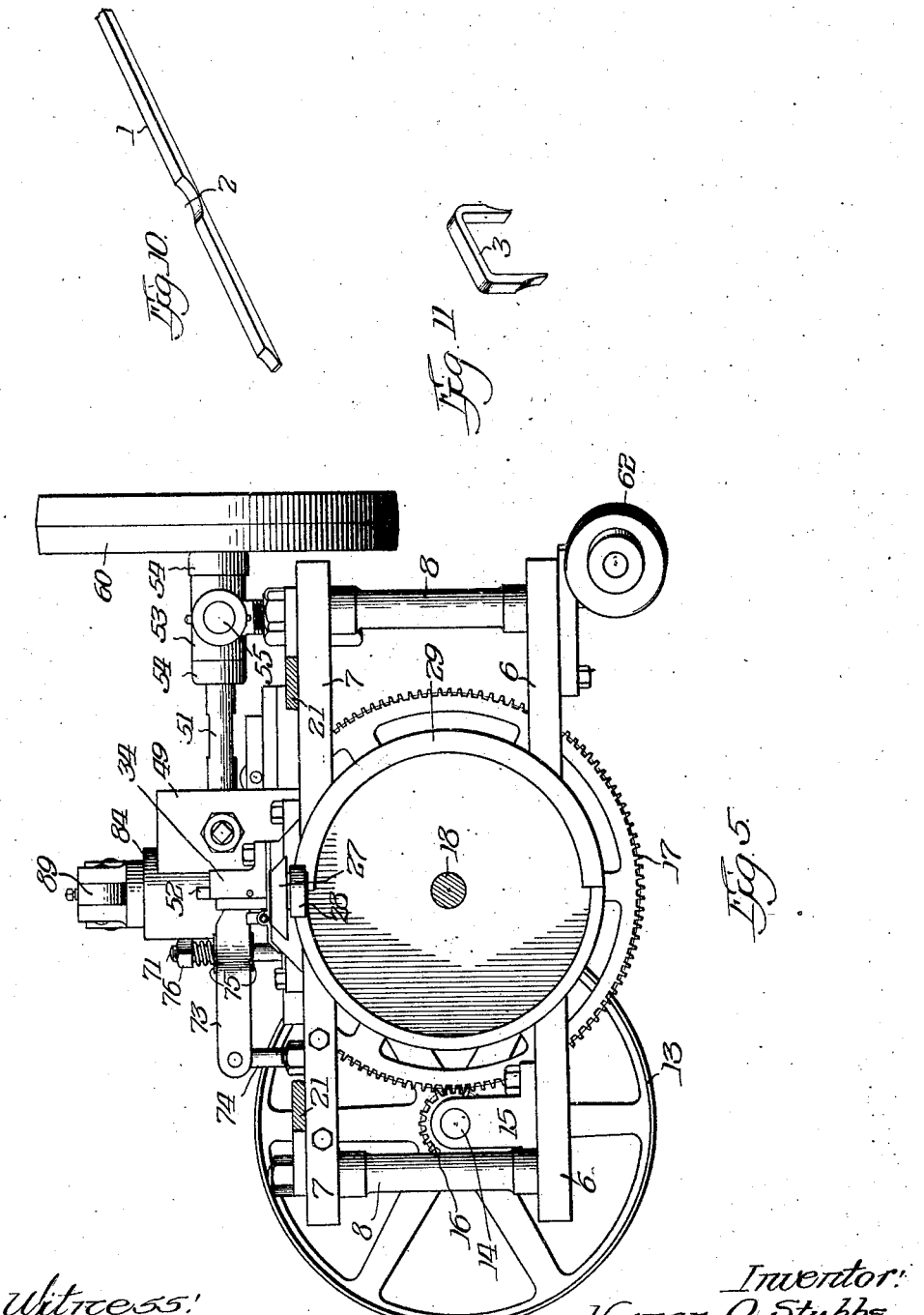

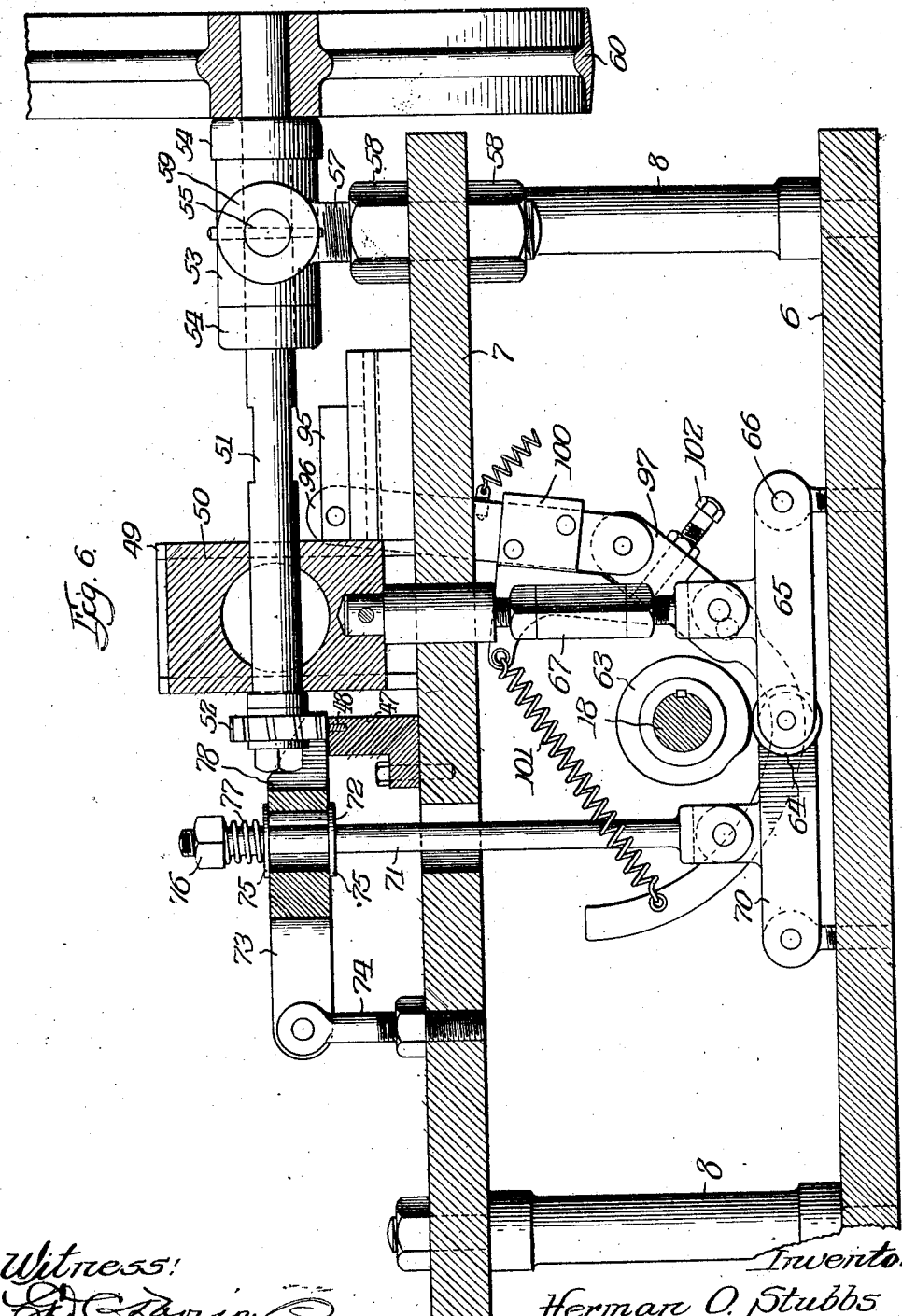

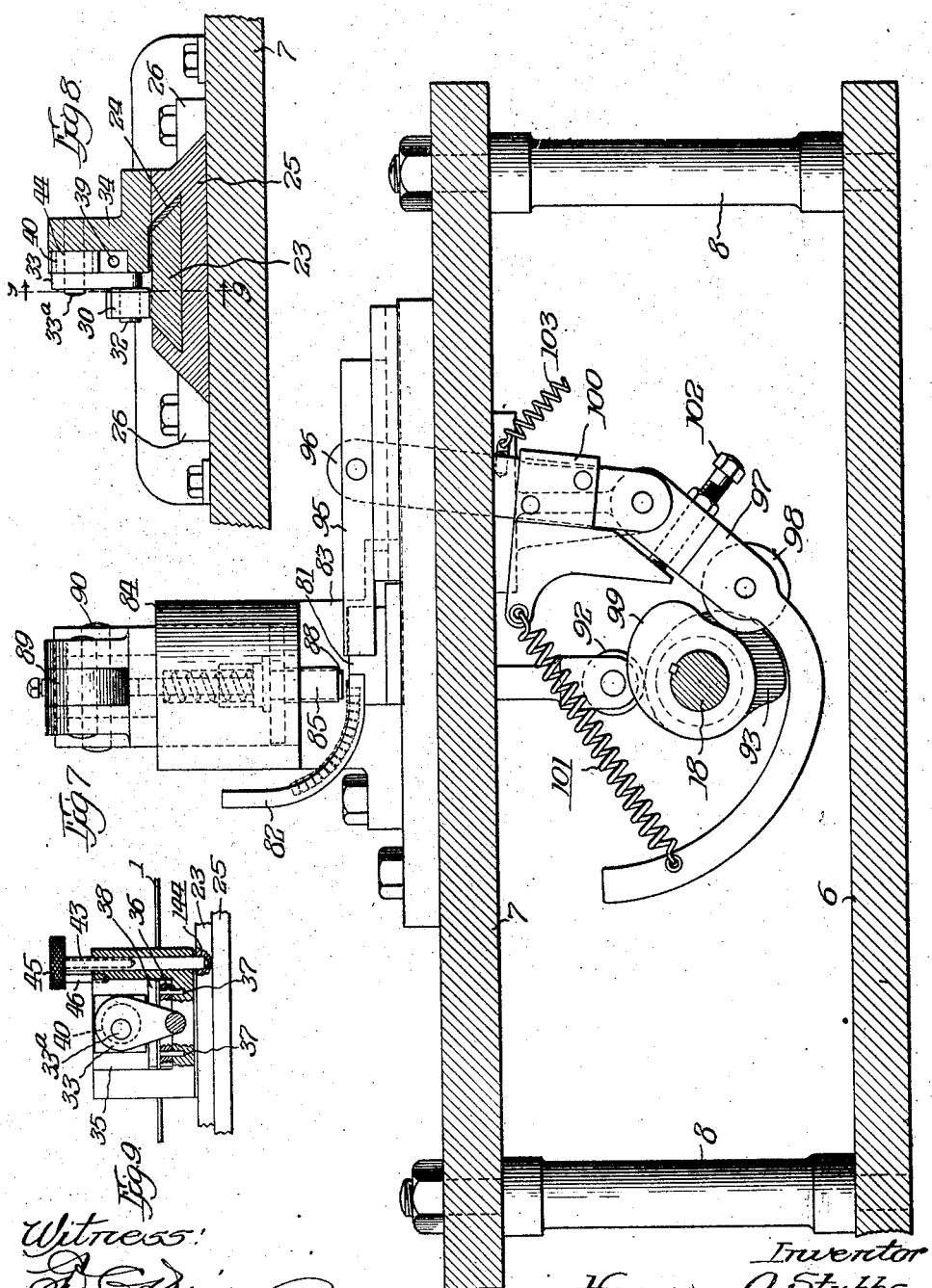

1,594,860

UNITED STATES PATENT OFFICE.

HERMAN O. STUBBS, OF AKRON, OHIO, ASSIGNOR TO THE FIRESTONE TIRE AND RUBBER COMPANY, OF AKRON, OHIO, A CORPORATION OF OHIO.

STAPLE-MAKING MACHINE.

Application filed September 12, 1921. Serial No. 499,985.

This invention relates to a machine for the manufacture of staples or the like from a flat wire and the object of the invention is to improve upon existing types of machines for this purpose. The machine shown and described herein will make staples rapidly and accurately and will require little or no attention during operation. It is simple in construction and will require but few repairs. Other objects and advantages will appear as the description proceeds, it being understood that the drawing and description are such as to enable one skilled in the art to understand the invention and are not intended as limiting the scope of the attached claims.

In the drawings:

Fig. 1 is a side elevation of a staple making machine embodying the principles of my invention.

Fig. 2 is a bottom plan elevation.

Fig. 3 is a front view.

Fig. 4 is a longitudinal section along the line of travel of the wire.

Fig. 5 is an end view taken in front of the feeding cam.

Fig. 6 is a transverse section at the milling tool.

Fig. 7 is a transverse section at the bending or stapling head.

Fig. 8 is a transverse section through the feeding slide.

Fig. 9 is a section on the line 9—9 of Fig. 8.

Fig. 10 is a perspective view of the wire after the milling operation but before the staples are cut.

Fig. 11 is a view of the completed staple.

The machine of this invention is constructed so as to manufacture staples from a length of flat wire, which is advanced step by step the required distance to furnish wire for a single staple. While the wire is stationary a rotating milling cutter is brought to bear upon the upper surface, cutting away the wire in an arc until it is almost severed, leaving a thin web as shown in Fig. 10, in which 1 represents the wire and 2 the arc shaped notch cut in the wire. The wire now passes to a stapling head at which it is cut in the center of the notch 2, the thin edge at the notch providing a sharp point for the staple. A continued movement of the stapling head bends down the points to form the finished staple 3 in Fig. 11.

The stapling operation is performed on a long anvil and a stripper or ejector moves the staple transversely of the original wire. The anvil and the track on which the staples are pushed is so arranged that a stream of several staples remains in the machine. The stapling hammer is of sufficient width so that it will embrace two or three staples at a time on the anvil, as a result of which action each staple receives several blows. The repeated blows have been found necessary, as, after only one blow there is a tendency for the staple to spring back slightly, which tendency is overcome effectually after several blows of the hammer.

The machine is supported on A shaped standards or uprights 4, the upper ends of which are formed with steeply inclined faces 5 on which is seated the base plate 6 of the machine. A second or face plate 7 is secured to the plate 6 by a suitable number of pillars or uprights 8. The plate 7 is arranged at the angle shown for the purpose of allowing the chips of the milling cutter to be removed from the machine by a stream of water such as used in machine operations and for this reason care should be exercised in reading the drawings to bear in mind that the plates 6 and 7 are tilted and not horizontal. Thus in Fig. 7 for example, the sheet should be considered when held inclined toward the right.

Located on a shelf 9 in the lower part of the framework is the motor 10, which is connected by a belt 11, operated upon a belt tightener 12, to a pulley 13, located on a short shaft 14 mounted on bearings 15 attached to the plates 6. The shaft 14 carries a pinion 16 which meshes with a large gear 17, keyed to a main cam shaft 18 which is rotated in bearings 19 rising from the base plate 6.

The wire 1 coming from any suitable source passes first through a wire straightener indicated by the numeral 20, carried on brackets 21 from the side of the machine. This straightener may be of any preferred form, here being shown as consisting of a plurality of rollers 22 as is well known in the art.

The wire passes from the straightener to a feeding device. The device comprises an upper slide 23 having upwardly tapered sides, which fit within a tapered dove-tailed guideway 24, formed on the upper surface of a second or lower slide 25, which is in turn guided between two gibs or rails 26 secured to the upper surface of the plate 7. The upper slide 23 has a rearwardly extending tail piece 27 on the under side of which are two cam rollers 28, engaging the opposite faces of a double cam 29, which is mounted on the end of the shaft 18. As the cam 29 rotates the wire is fed forward intermittently by means carried by the two slides as will be explained.

Formed at the forward end and at one side of the slide 23 are a pair of blocks or projections 30, between which is mounted for vertical reciprocation a small block 31. This block receives a crank pin 32 on the end of a lever 33 which is carried on a pin 33ª, rotatably mounted in a bracket 34 which is secured to the lower slide 25.

The front face of the bracket 34 is provided with a vertical recess or embrasure 35 on the lower surface of which is fitted a lower wire clamping jaw 36, provided with dowel pins 37 which project within the body of the bracket 34. Above the plate 36 is located an upper wire clamping jaw 38 which rests on the plate 36. The wire 1 passes through apertures 39 in the walls at either side of the embrasure and between the two jaws or plates 36 and 38. An eccentric 40 is formed at the rear of the lever 33 and is arranged within a slide block 44, which is moved to bear upon the upper side of the plate 38 during the forward or feeding movement and to release the two plates upon the back stroke of the feeding mechanism.

The operation of the feeding mechanism will be understood from the description which has been given. The upper slide 23 is reciprocated back and forth by the cam 29. On its forward movement the lever 33 is rocked by the block 31 until the eccentric 40 has clamped the jaws 36 and 38 on the wire. The two slides 23 and 25 are then locked together until the completion of the feeding stroke. Upon the return movement of the slide 23, the first action is to release the wire clamping jaws 36 and 38 whereupon the slide 23 moves backwardly on slide 25 until the rear block 30 strikes the end of a set screw 41 received in a bridge plate or bracket 42 secured to the lower slide 25 and bridging the upper slide 23. The two slides then move back in unison. The amount of wire fed forward by the feeding mechanism may be accurately adjusted by setting of the pin 41.

If it is desired to stop the feeding of the wire without shutting down the machine, the two slides 23 and 25 may be locked together at their rearward limit of movement by a pin 43 which passes through the overhanging bracket 34 and into a hole 144 on the slide 23. The pin 43 is provided with a head 45 from which extends a detent 46 by which the pin may be held in elevated or lowered position as will be understood.

From the feeding device the wire passes to a table 47 on which the milling operation takes place the upper surface of the table being provided with an inserted hardened strip 48 over which the wire travels. Located in the rear of the table 47 are a pair of vertical guideways 49 in which is arranged a reciprocating bearing block 50 which carries a rotating shaft 51, the forward end of which projects over the table 47 and carries a rotating milling cutter 52.

The rear of the shaft 51 is supported in a journal box 53, being held in position by collars 54. The journal box 53 is formed with a laterally projecting shaft 55 which is received in a bearing 56, the underside thereof carrying threaded stud 57 by which it is supported on the table between adjustable nuts 58. A pinned collar 59 holds the shaft 55 in position. The rear end of the shaft 51 is provided with a pulley 60, around which passes a driving belt 61, trained over pulleys 62 and leading to the shaft of the motor 10, by which the cutter is driven.

The bearing block 50 is moved vertically through a sufficient distance to enable the milling cutter to pass into the wire the proper distance, by means of a cam 63 carried on the cam shaft 18. This cam bears against a roller 64 on the outer end of a lever 65 pivoted at 66 on the plate 6. The lever 65 is connected to the reciprocating bearing block 50 by an adjustable link 67, which is formed as shown in Fig. 6 with a turnbuckle and right and left hand screw threaded parts. If it is desired to adjust the depth of the cut which the milling cutter makes, the link 67 and the screw threaded bearing post 57 are given the proper adjustments.

A second cam 68 is carried on the shaft 18 adjacent the cam 63 which cam bears against a roller 69 on a pivoted lever 70, that is connected to a link 71. The upper end of the link 71 passes through an aperture 72 formed in a clamping arm 73 which is pivotally and adjustably mounted in the end of a threaded stud 74, secured in the upper plate 7. Attached to the link 71 on either side of the clamping arm 73 are two plates 75 and at the upper end of the link 71 is a nut 76 between which and the upper plate 75 is carried a spring 77. The forward end of the clamping arm is bifurcated to provide two fingers 78 which are located over the table 47 at the two sides of the milling cutter. The under surfaces of the fingers 78 are provided with hardened and roughened gripping surfaces 79 and the upper side of the strip 48 may be similarly roughened at the gripping point, if desired.

The operation of the parts just described is as follows: During the feeding movement of the wire the fingers 78 and the milling cutter are raised. Immediately upon cessation of the feeding movement, the clamping fingers 78 descend and grip the wire. The milling cutter now descends by actuation of the cam 63 and the notch 2 is cut. The milling cutter and the gripping fingers are then raised for the next advance of the wire.

The wire now passes on to a cutter block 80, the upper surface of which may be grooved to receive the wire and the edge of which is hardened to provide a cutting surface and is located as to be under the lowermost point of the notch 2.

In front of the cutter block 80 is carried an anvil 81 on to which the forward end of the wire is pushed. The anvil has a curved lateral extension or horn 82 down which the staples pass the curvature of the horn being such that a closely packed stream of staples will be found thereon. The staples finally drop off the end of the horn.

Beyond the anvil is secured a bracket 83 the head 84 of which overhangs the anvil 81. The anvil is wide enough and so located as to be in the center of the length of wire between the notches leaving enough of the wire to make the legs or points of the staple. Over the anvil in the head 84 is slidably mounted a hammer 85, the lower end of which is shaped as shown in Fig. 4, with a recess 86 to fit over the anvil and wings 87 to bend the legs of the staples downwardly. The edge of the wing 87 nearer the cutter block 80 is sharpened so as to coact with the block and sever the wire to form a staple on downward movement of the head.

In the center of the hammer is located a spring held plunger 88, which, upon downward movement of the hammer grips the short piece of wire and holds it in position for the cutting and bending operation. As the notch is almost through the wire the resulting edge on the wire after the cutting operation is sufficiently sharp to serve the uses to which the staple is put.

The hammer is raised and lowered to cut off the staple and bend it, by a lever 89, pivoted at 90 on the upper surface of the bracket 83, the end of the lever being connected to an adjustable link 91, which passes through the table 7 and carries a roller 92 bearing against a cam 93 on the shaft 18. Springs 94 are attached to the lever 89 and the bracket 83 and move the lever 89 in opposition to the cam 93.

The staples are formed on the anvil 81 and rest in a long row on the anvil and the horn extension 82. They are moved transversely of their former line of travel by an inverted trough shaped plunger or stripper 95 which slides over the anvil. This stripper is actuated by a pivoted link 96 which is pivoted in turn to a link 97 carrying a roller 98 bearing against a cam 99 on the shaft 18. The end of the link 97 is curved upwardly and connected to a bracket 100 on the part 96 by a spring 101, a set screw 102 being utilized for holding the links 96 and 97 in alignment. A spring 103 holds the compound lever 96 and 97 against the cam 99. The reason for forming the actuating lever for the stripper in two parts connected together so as to yield if necessary is to prevent breakage of the parts should the staples jam on the anvil or the hammer stick. The staples are pushed along on the horn 82 by the ejector 95 until they drop off the end into a suitable receptacle.

It will be noted that the width of the hammer as shown in Fig. 7 is over several staples, the reason for which was gone into in detail in the opening portions of the specifications. It is sufficient here to state that by this means a plurality of blows are delivered to each staple giving it a permanent set.

As is usual in milling and other metal working machinery I provide means for circulating water over the cutter and as the face plate 7 is inclined as shown in Fig. 1, the water serves to wash away the chips.

The water is poured over the milling cutter from a pipe 104 and runs down over the face of the plate 7, taking the chips with it into a container 105, in which is located a suitable sieve, and into a pipe 106, from which it passes to a pump 107 and into the pipe 104. A belt 108 drives the pump from a pulley 109 located on the end of the cam shaft 18. A belt tightener 110 may be used if desired.

As each portion of the machine was fully described as it took its place in the specification, it is not believed to be necessary to enter into a fully detailed account of the mode of operation of the machine. The wire is fed forward, clamped, notched, cut and bent and the staple discharged automatically and without the use of complicated machinery. The machine will run for long periods of time without any attention whatsoever. It permits of universal adjustment so that different size staples may be made after the necessary adjustments have been made. A dash plate 111 may be used to direct the water into the proper channel.

While the description has been detailed and accurately describes one machine embodying the invention, it will be understood that the claims are not limited to the exact form of apparatus shown, but may be con-

Claims:

1. In an apparatus for manufacturing staples from wire, the combination of feeding means for advancing the wire intermittently, means for notching the wire at intervals, and means for cutting the wire at a notch and forming a staple from the end of the wire cut off.

2. In an apparatus for manufacturing staples from wire, the combination of a milling cutter for partially severing the wire, and a hammer for completely severing the wire and bending it to form a staple.

3. In an apparatus for manufacturing staples from wire, the combination of a rotary milling cutter, means for moving said milling cutter toward and away from the wire to partially sever the same, and a hammer for completely severing the wire and bending it to form a staple.

4. In an apparatus for manufacturing staples from wire, the combination of means to notch the wire to partially sever the same, a hammer to complete the severing of the wire, and to form the staples from the end of the wire, and means to shift the staple to receive a succession of blows from the hammer.

5. In an apparatus for manufacturing staples from wire, the combination of means to notch the wire to partially sever the same, means to grip the wire during the notching operation, a reciprocating hammer having a cutting surface to complete the severing of the wire, and a forming surface to shape the wire into a staple.

6. In an apparatus for manufacturing staples from wire, the combination of means to notch the wire to partially sever the same, a reciprocating hammer having a cutting surface to complete the severing of the wire and a forming surface to shape the wire into a staple, means to feed the wire through the said instrumentalities and means to shift the formed staple from the line of the wire so as to subject the same to a second blow of the hammer.

7. In a device of the character set forth, means for feeding a wire, a pair of spaced gripping fingers, a rotary milling cutter, means to move the fingers toward the wire to clamp the same and means to move the milling cutter into the wire, while it is gripped by the said fingers.

8. In a device of the character set forth, means for feeding a wire, a pair of spaced gripping fingers, a rotary milling cutter, means to move the fingers toward the wire to clamp the same, means to move the milling cutter into the wire, while it is gripped by the said fingers and means to complete the severing of the wire and form a staple from the end of the wire after it has been severed.

9. In a device of the character set forth, a table, means for moving a wire across said table, a movable arm adjacent the table, a pair of fingers on said arm, a second movable arm, a notching tool on said second arm located between the two said fingers and means to move said arms toward the table to clamp the wire and force the notching tool into the wire.

10. In a device of the character set forth, a table, means for moving a wire across said table, a movable arm adjacent the table, a pair of fingers on said arm, a second movable arm, a notching tool on said second arm located between the two said fingers, means to move said arms toward the table to clamp the wire and force the notching tool into the wire, and means to cut off the wire at the notch and form a staple therefrom.

11. In a device for making staples from wire, comprising a table over which the wire is passed, a rotatable and rocking shaft arranged transversely of the table, a milling cutter on the end of the shaft, means for rocking the shaft to force the milling cutter into the wire, a rocking arm, fingers on the end of said arm located at either side of the milling cutter, and means to rock said arm to bring the fingers in clamping relation to the wire during the operation of the milling cutter.

12. In a staple making machine, a device for feeding wire, a cutter adapted to form a notch extending part of the way through the wire, and a hammer having provisions for cutting the wire at the notch and for bending the legs to form the staple.

13. In a staple making machine a device for feeding wire, means adapted to form a notch extending part way through the wire, and a hammer having provisions for cutting the wire at the notch and additional provisions for bending the legs to form the staple.

14. In a staple making machine, a device for feeding wire, means adapted to form a notch extending part way through the wire, a hammer, the width of said hammer being sufficient to cover a plurality of staples, and anvil on which the staples are formed by the hammer, and means to feed the staples along the anvil to receive a succession of blows from the hammer.

15. In a staple making machine, an anvil, a hammer over the anvil, so shaped as to form the wire into a staple and of width sufficient to cover a plurality of staples and means to feed the staples along the anvil so that they receive a succession of blows from the hammer.

16. In a staple making machine, an anvil, an extension on said anvil, an ejector reciprocating over the anvil and operating to stack the staples thereon and a hammer over the anvil of a width sufficient to cover a plurality of staples, 17. A staple making machine, comprising a table, means for cutting notches part way through the stock on said table, a cutting block and means for severing the stock on the cutting block, at the notch, whereby the sharp edges are formed on the staple.

18. A staple making machine, comprising a table, a milling cutter operating on the stock on said table to form an arc shaped notch therein, a cutting block, means to feed the stock from the table to the block, and means to cut the stock at the lowest point of the notch to form the sharp edges on the staple.

HERMAN O. STUBBS.